United States Patent Office 3,521,912
Patented July 28, 1970

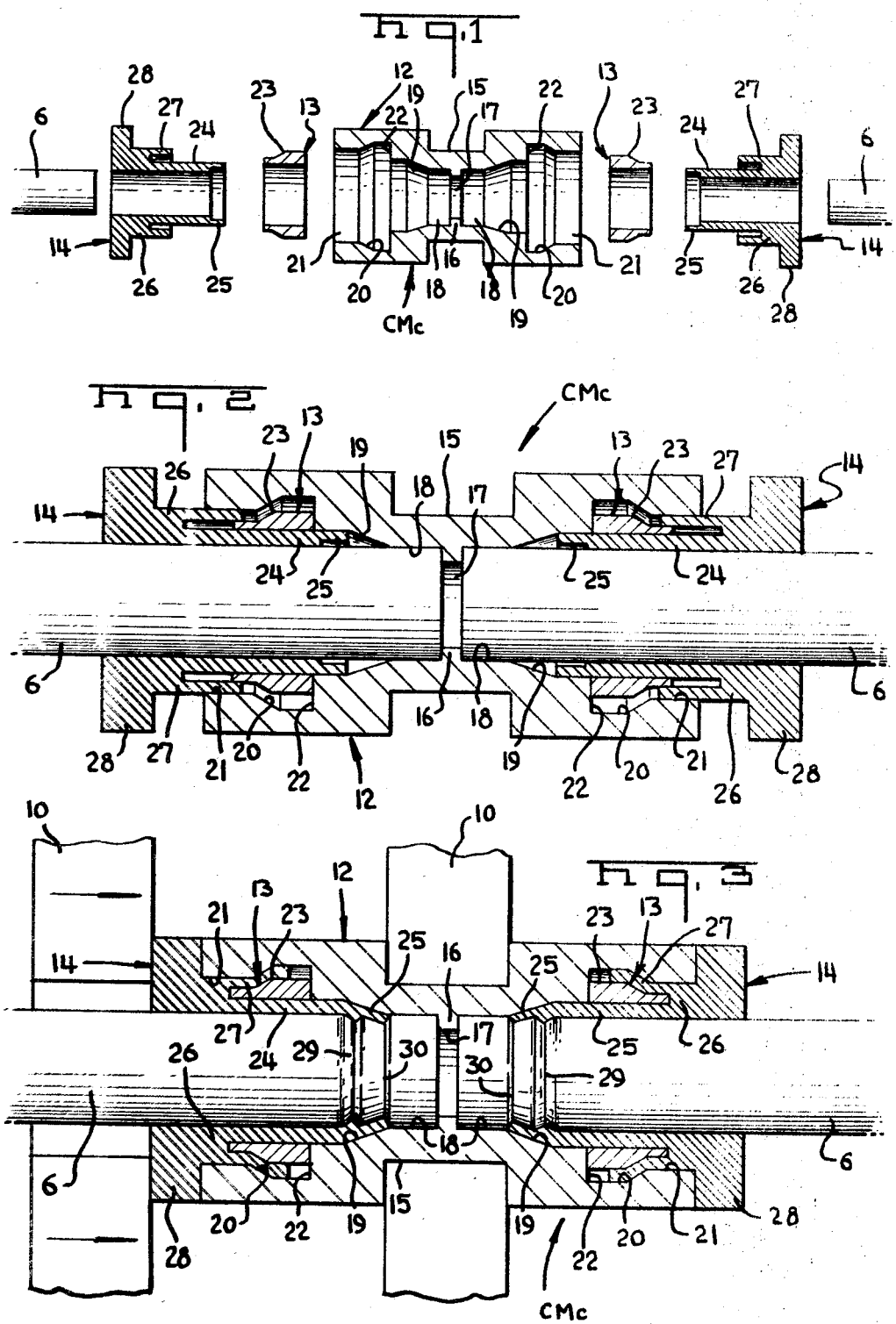

3,521,912
TUBE COUPLING HAVING DEFORMABLE GRIPPING MEANS
John Franklin Maurer, Camp Hill, Pa., assignor to AMP Incorporated, Harrisburg, Pa.
Original application Oct. 18, 1966, Ser. No. 587,944. Divided and this application Aug. 26, 1968, Ser. No. 777,525
Int. Cl. F16l 19/08
U.S. Cl. 285—39                 5 Claims

ABSTRACT OF THE DISCLOSURE

A tubular connection member comprises a tubular body member provided with an interior surface having axially-spaced camming surfaces, the end of the tubular member being disposed within the interior surface. An insert is disposed on the end of the tubular member and having an annular section, and a ring is provided with a camming area positioned on the insert with the camming area facing the annular section. The insert is forcefully driven within the interior surface of the body member with the leading end of the insert being driven against the tubular member by the inner camming surface, and the annular section being flared by the camming area into engagement with the outer camming surface and secured between the outer camming surface and camming area.

CROSS-REFERENCE TO RELATED APPLICATION

This application is a division of copending application, Ser. No. 587,944, filed Oct. 18, 1966 and now abandoned.

This invention relates to tubular connection members, a tool for applying them to conduit members and a method of applying the connection members to conduit members.

In the field of conduit, tubular or pipe couplings, a variety of connection members have been used, such as, threaded nut members mating with threaded ends of a body member; soldering, gluing or welding ends of the conduit members to be coupled onto a tubular member of slightly less diameter or into a tubular member of slightly greater diameter; threading the ends of the conduit members to mate with the threaded portions of a coupling member; flaring one end of a conduit member and inserting the end of another conduit member therein in telescopic relationship, etc.

These connection members and types similar thereto involve a large amount of time and labor to apply them to the tubular members in addition to the fact that some of them are expensive.

It is, therefore, a primary object of the present invention to provide connection members which are easily applied to tubular members to interconnect same.

Another object of the present invention is the provision of connection members which are inexpensive and which, when applied to tubular members to interconnect them, provide a sealed connection capable of withstanding pressure.

An additional object of the present invention is to provide connection members which may be substantially transparent for observation and indication purposes, acts like a snubber curbing vibration and acts as an insulator.

A still further object is to provide connection members having means on the body thereof in which one part of a tool is disposed to assist in axially moving ferrule means into engagement with the body of the connection members.

Still an additional object of the invention is the provision of connection members having means on the body thereof to secure ferrule means thereon.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

The foregoing and other objects are achieved by a preferred embodiment of a connection member to interconnect ends of tubular conduit members which comprises a hollow tubular member having a centrally located annular shoulder on an interior surface, the ends of the tubular conduit members being disposed within the tubular member against the annular shoulder, the tubular member being provided with means on an exterior surface for engagement with a jaw member of a tool means, ferrule members axially movable along the tubular conduit members and along sections of the tubular member by another jaw member of the tool means, and means on the ferrule members and on the tubular member to secure the ferrule members in position on the tubular member to sealingly secure the tubular conduit members in position in the tubular member.

In the drawing:

FIG. 1 is an exploded and cross-sectional view of the elements of connection member; and FIGS. 2 and 3 are cross-sectional views of FIG. 1 in partially and completely assembled conditions, respectively.

FIGS. 1 through 3 illustrate connection member CMc which comprises a hollow body member 12, rings 13 and inserts 14. Hollow body member 12 is preferably made from a suitable metallic material and includes an annular channel 15 disposed in an exterior surface of body member 12 about midway thereof. The interior surface of body member 12 includes an annular shoulder 16 having an opening 17 therein. On each side of shoulder 16, the interior surface includes a first section 18 having a diameter corresponding to the diameter of tubular members 6. Adjacent each of first sections 18 and outwardly therefrom is a first camming surface 19 and outwardly from camming surface 19 is a second camming surface 20. Outwardly from camming surface 20 is an annular surface 21 to receive inserts 14. An abutment surface 22 is disposed between camming surfaces 19 and 20.

The interior surface of rings 13 receives a part of insert 14 while the external surface of rings 13 define a camming surface 23. Inserts 14 have a first part 24 having an inside diameter corresponding to the diameter of tubular member 6 and an outside diameter corresponding to the inside diameter of rings 13. The leading end of first part 24 includes a reduced section 25. A second part 26 of inserts 14 includes an annular section 27 concentric with first part 24 and spaced outwardly therefrom. Second part 26 also includes a flange 28.

The assembly of connection member CMc is effected in accordance with the following procedure:

The inserts 14 are slipped onto respective tubular members 6 with rings 13 placed on first parts 24 of inserts 14; the thinnest portions of these rings being directed toward annular sections 27 of the inserts. With rings 13 on inserts 14 and inserts 14 on respective tubular members 6, the ends of the tubular members are inserted within body member 12 so that the ends of the tubular members abut against annular shoulder 16, the diameter of opening 17 corresponding to the inside diameter of tubular members 6. Inserts 14 are manually pushed into body member 12 with rings 13 abutting against abutment surfaces 22 and the thin portions of rings 13 disposed between annular sections 27 and parts 24 of inserts 14 as illustrated in FIG. 2.

The ends of tubular member 6 disposed within hollow body member 12 are initially unformed and are subjected to a forming operation during axial compression of the parts 13, 14 relative to 12 to form a first groove 29 and a second groove 30 which is deeper than groove 29.

An interconnection between the tubular members is accomplished as follows: One of jaw members 10 is disposed within annular channel 15 of body member 12 while the other jaw member is brought into engagement with flange 28 of one of inserts 14 as illustrated in FIG. 3. The tool is actuated with the jaw member moving insert 14 within body member 12 until flange 28 is moved into engagement with the end of body member 12. The action of first part 24 and annular section 27 of insert 14 as they are moved along camming surfaces 19 and 20 causes the leading end of first part 24 to be bent and driven inwardly with reduced section 25 forming groove 30 while the stepped section between reduced section 25 and first part 24 is forming groove 29. This forming serves to apply radial pressure on the tubular member to secure the tubular member in position within the body member. Annular section 27 is moved along camming surface 20 of body member 12 and camming surface 23 of ring 13 causing annular section 27 to apply radial pressure to ring 13. Radial pressure is also applied by ring 13 to first part 24 of insert 14 which in turn applies radial pressure to tubular member 6. Thus, radial pressure is applied to tubular member 6 at spaced locations by camming surface 19 and the leading edge of part 24 at one location and by camming surface 20, camming surface 23, ring 13 and part 24 at a second location. As can be discerned, camming surface 19 moves the leading end of part 24 inwardly while camming surfaces 20 and 23 move annular section 27 outwardly with annular section 27 wedged between camming surfaces 20 and 23. Abutment surface 22 limits the inward movement of ring 13 within body member 12 so that annular section 27 is wedged between camming surfaces 20 and 23. The foregoing procedure is followed to secure the other tubular member in the other end of body member 12 to positively secure the ends of the tubular members within the connection member thereby effecting an interconnection between the tubular members.

Body member 12, rings 13 and inserts 14 are made from a suitable material to effect the interconnection between the tubular members and any suitable material of metal or plastic or combination thereof may be utilized to effect the desired result. If desired, an O-ring may be disposed on surface 23 of each of rings 13 so that the O-ring may be disposed between camming surfaces 20 and 23, abutment surfaces 22 and the leading end of annular sections 27. It is also contemplated that for certain applications and certain tubular materials the grooves 29 and 30 may be partly or wholly preformed before insertion; the camming surfaces operating to effect the connection as before.

As can be discerned, there has been disclosed a connection member to interconnect tubular or conduit members in a positive and sealed manner therewithin.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. A connection member for securing an end of a tubular member therein comprising a tubular body member having an exterior surface and an interior surface, said interior surface adapted to receive therein the end of the tubular member and having an inner stop surface against which the end of the tubular member engages to limit the movement of the tubular member therein and an outer stop surface, inner and outer oppositely facing camming surfaces axially spaced along said interior surface, insert means having an inner end and a skirt spaced radially outwardly from said inner end, a deforming member having an external camming area adapted to be disposed on said insert with said camming area facing said skirt, said insert means and said deforming member being positioned on the tubular member and the end of the tubular member being positioned in said body member with the end of the tubular member being directed toward said inner stop surface, said insert means and said deforming member being forcefully driven into said body member causing said inner end of said insert means to engage said inner camming surface and be driven into deforming engagement with the tubular member thereby securing the tubular member in position and said deforming member engaging said outer stop surface with said skirt being driven between said camming area and said outer camming surface thereby securing said insert means in position.

2. A connection member according to claim 1 wherein said inner end of said insert means is of reduced cross-section.

3. A connection member according to claim 1 wherein said deforming member is a ring.

4. A connection member according to claim 1 wherein said body member is provided with an annular channel for receiving a jaw member of tool means while another jaw member of the tool means engages an outer end of said insert means to forcefully drive said insert means within said body member.

5. A connection member according to claim 1 wherein said skirt is annular and concentric with respect to said insert means.

References Cited

UNITED STATES PATENTS

| 2,880,020 | 3/1959 | Audette | 285—255 |
| 3,121,941 | 2/1964 | Bellarts | 29—252 |
| 3,149,860 | 9/1964 | Hallesy | 285—382.2 |
| 3,250,550 | 5/1966 | Lyon | 285—382.7 X |
| 3,325,192 | 6/1967 | Sullivan | 285—382.7 X |

FOREIGN PATENTS

| 486,975 | 6/1938 | Great Britain. |
| 93,818 | 4/1959 | Norway. |

THOMAS F. CALLAGHAN, Primary Examiner

U.S. Cl. X.R.

29—520, 522; 285—342, 369, 382.7